United States Patent
Abu-Amara

(10) Patent No.: US 8,819,838 B2
(45) Date of Patent: Aug. 26, 2014

(54) PIRACY PREVENTION IN DIGITAL RIGHTS MANAGEMENT SYSTEMS

(75) Inventor: Hosame H. Abu-Amara, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 935 days.

(21) Appl. No.: 12/020,183

(22) Filed: Jan. 25, 2008

(65) Prior Publication Data

US 2009/0193523 A1   Jul. 30, 2009

(51) Int. Cl.
*G06F 7/04* (2006.01)

(52) U.S. Cl.
USPC ...... 726/26; 726/5; 726/27; 726/29; 713/178; 713/169

(58) Field of Classification Search
USPC ............... 726/4–7, 17–19, 23, 30, 26, 29; 713/168, 176–179, 169; 705/51
See application file for complete search history.

(56) References Cited

U.S. PATENT DOCUMENTS

| | | | | |
|---|---|---|---|---|
| 6,499,105 | B1 * | 12/2002 | Yoshiura et al. | 713/176 |
| 7,073,063 | B2 * | 7/2006 | Peinado | 713/171 |
| 7,526,451 | B2 * | 4/2009 | Park et al. | 705/51 |
| 7,568,234 | B2 * | 7/2009 | Naslund et al. | 726/26 |
| 7,594,275 | B2 * | 9/2009 | Zhu et al. | 726/26 |
| 7,680,744 | B2 * | 3/2010 | Blinn et al. | 705/59 |
| 7,769,641 | B2 * | 8/2010 | Jouret et al. | 705/26.1 |
| 7,835,992 | B2 * | 11/2010 | Meyer et al. | 705/59 |
| 7,840,489 | B2 * | 11/2010 | Candelore | 705/59 |
| 8,086,535 | B2 * | 12/2011 | Zweig et al. | 705/53 |
| 8,233,860 | B2 * | 7/2012 | Lee | 455/127.3 |
| 8,321,673 | B2 * | 11/2012 | Lee | 713/169 |
| 8,474,054 | B2 * | 6/2013 | Vantalon et al. | 726/27 |
| 2003/0118182 | A1 | 6/2003 | Elomaa et al. | |
| 2005/0182939 | A1 * | 8/2005 | Yoshiura et al. | 713/176 |
| 2005/0277403 | A1 * | 12/2005 | Schmidt et al. | 455/410 |
| 2006/0062426 | A1 * | 3/2006 | Levy et al. | 382/100 |
| 2006/0282391 | A1 * | 12/2006 | Peterka et al. | 705/57 |
| 2007/0005506 | A1 * | 1/2007 | Candelore | 705/59 |
| 2007/0112681 | A1 | 5/2007 | Niwano et al. | |

(Continued)

FOREIGN PATENT DOCUMENTS

| | | |
|---|---|---|
| KR | 1020070098368 A | 10/2007 |
| RU | 2265961 C2 | 12/2005 |
| WO | 2005076104 A2 | 8/2005 |
| WO | 2006043784 A1 | 4/2006 |

OTHER PUBLICATIONS

Debin Gao, "Gray-box extraction of execution graphs for anomaly detection", Feb. 2004, Vo 11, pp. 318-329.*

(Continued)

*Primary Examiner* — Cordelia Zecher
*Assistant Examiner* — Viral Lakhia
(74) *Attorney, Agent, or Firm* — Amin, Turocy & Watson, LLP

(57) ABSTRACT

A method in a multimedia device (130) including obtaining protected content having a limited exercisable right associated therewith, obtaining an extension of the limited exercisable right when a condition is satisfied, for example, when the device enters a DRM system different than the DRM system from which the protected content originated, wherein the extension of the limited exercisable right is obtained from an entity other than the multimedia device, for example, from an anomaly detector.

14 Claims, 4 Drawing Sheets

(56) References Cited

U.S. PATENT DOCUMENTS

| | | | |
|---|---|---|---|
| 2007/0143856 A1* | 6/2007 | Aerrabotu et al. | 726/26 |
| 2007/0156601 A1 | 7/2007 | Brew et al. | |
| 2007/0208742 A1 | 9/2007 | Nusser et al. | |
| 2008/0010457 A1* | 1/2008 | Lee et al. | 713/169 |
| 2008/0127177 A1* | 5/2008 | Oh et al. | 717/174 |
| 2008/0133731 A1* | 6/2008 | Bradley et al. | 709/223 |
| 2008/0140433 A1* | 6/2008 | Levy et al. | 705/1 |
| 2008/0155260 A1* | 6/2008 | Perez et al. | 713/169 |
| 2008/0242280 A1* | 10/2008 | Shapiro et al. | 455/414.3 |
| 2008/0244713 A1* | 10/2008 | Jogand-Coulomb | 726/5 |
| 2008/0250508 A1* | 10/2008 | Montague et al. | 726/28 |
| 2009/0007240 A1* | 1/2009 | Vantalon et al. | 726/4 |
| 2009/0025061 A1* | 1/2009 | Kravitz | 726/4 |
| 2010/0077206 A1* | 3/2010 | Lee et al. | 713/153 |
| 2010/0250665 A1* | 9/2010 | Okamoto et al. | 709/203 |
| 2010/0257370 A1* | 10/2010 | Yoon et al. | 713/189 |

OTHER PUBLICATIONS

Carlos Serrao et al.; Interoperability Mechanisms for Registration and Authentication on Different Open DRM Platforms; International Journal of Computer Science and Network Security; vol. 6, No. 12; Dec. 2006.

PCT Search Report and Written Opinion; Jun. 29, 2009; PCT/US2009/030519.

KIPO's Notice of Preliminary Rejection (English Translation), Nov. 24, 2011, all pages.

Communication, Supplementary European Search Report, Munich, Sep. 14, 2012, all pages.

Federal Service on Industrial Property, Patents and Trade Marks (Rospatent) "Decision on Grant" for Patent Application No. 2010135533/08(050447) dated May 30, 2013, 5 pages.

Communication pursuant to Article 94(3) EPC, for application No. 09704759.1-1956, Jan. 27, 2014, all pages.

Stuart E. Schechter, Rachel A. Greestadt, Michael D. Smith; "Trusted Computing, Peer-To-Peer Distribution, and The Economics of Pirated Entertainment"; 11 Pages.

Adam G. Pennington, John D. Strunk, John Linwood Griffin, Craig A.N. Soules, Garth R. Goodson, Gregory R. Ganger; "Storage-Based Intrusion Detection: Watching Storage Activity for Suspicious Behavior"; 15 Pages.

* cited by examiner

PIRACY PREVENTION IN DIGITAL RIGHTS MANAGEMENT SYSTEMS

FIELD OF THE DISCLOSURE

The present disclosure relates generally to digital rights management (DRM), and more particularly to DRM in multimedia devices that operate in interoperable DRM systems.

BACKGROUND

The interconnectivity of multimedia devices and the networks on which they operate along with the proliferation of digital rights management (DRM) systems make it likely that content protected by one DRM system will be distributed to, or used in, an environment where content is protected by some other DRM system. Interoperability among DRM systems will ensure that content protected in one DRM system may be translated into and protected by another system. While most DRM systems are neither standardized nor interoperable, several interoperability proposals have emerged. The Marlin Initiative is an industry sponsored specification that defines a common DRM architecture for the application, enforcement and exchange of rights in digital content among Marlin compatible client devices including portable media players, set-top boxes and mobile wireless communication devices. The Coral Consortium is an initiative backed by content owners, providers and hardware and software developers to develop a specification wherein client devices resolve interoperability issues among disparate DRM systems utilizing web-based and local services. Other interoperability proposals utilize a Domain Interoperability Manager (DIM) to manage the transfer of content and attending rights among different DRM systems.

Interoperability among different DRM systems is vulnerable to the distribution of pirated content that is subsequently protected under another DRM system. Such piracy is often the result of a vulnerability of the DRM system from which the content originated. Unprotected content may also be DRM protected after pirating. The application of DRM protection to pirated content is sometimes referred to as "white washing". Consumers often assume that DRM protected content is legitimate and are usually unaware that white washed content was pirated. Existing DRM interoperability proposals and systems operate under an assumption that the underlying source and destination DRM systems are uncompromised.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Content distribution systems are typically implemented as part of a communication network, for example, a cable system, a wireless communication network, the Internet, or other communication networks and combinations thereof. In such networks, content is generally distributed or otherwise provided by a content source, for example, from one or more content servers, to a multimedia device associated with a subscriber account or consumer. The content is generally protected by a DRM system that is implemented by a particular service provider or network operator. For example, a CATV service provider may implement a particular DRM for content provided or distributed over the cable system. Other content may be protected by a DRM system implemented by the content provider, for example, a content provider that distributes or otherwise provides content over an open network like the Internet. Exemplary DRM systems include but are not limited to OMA DRM, version 2, system and the OMA SCE version 1 system, among others.

Figure 1:
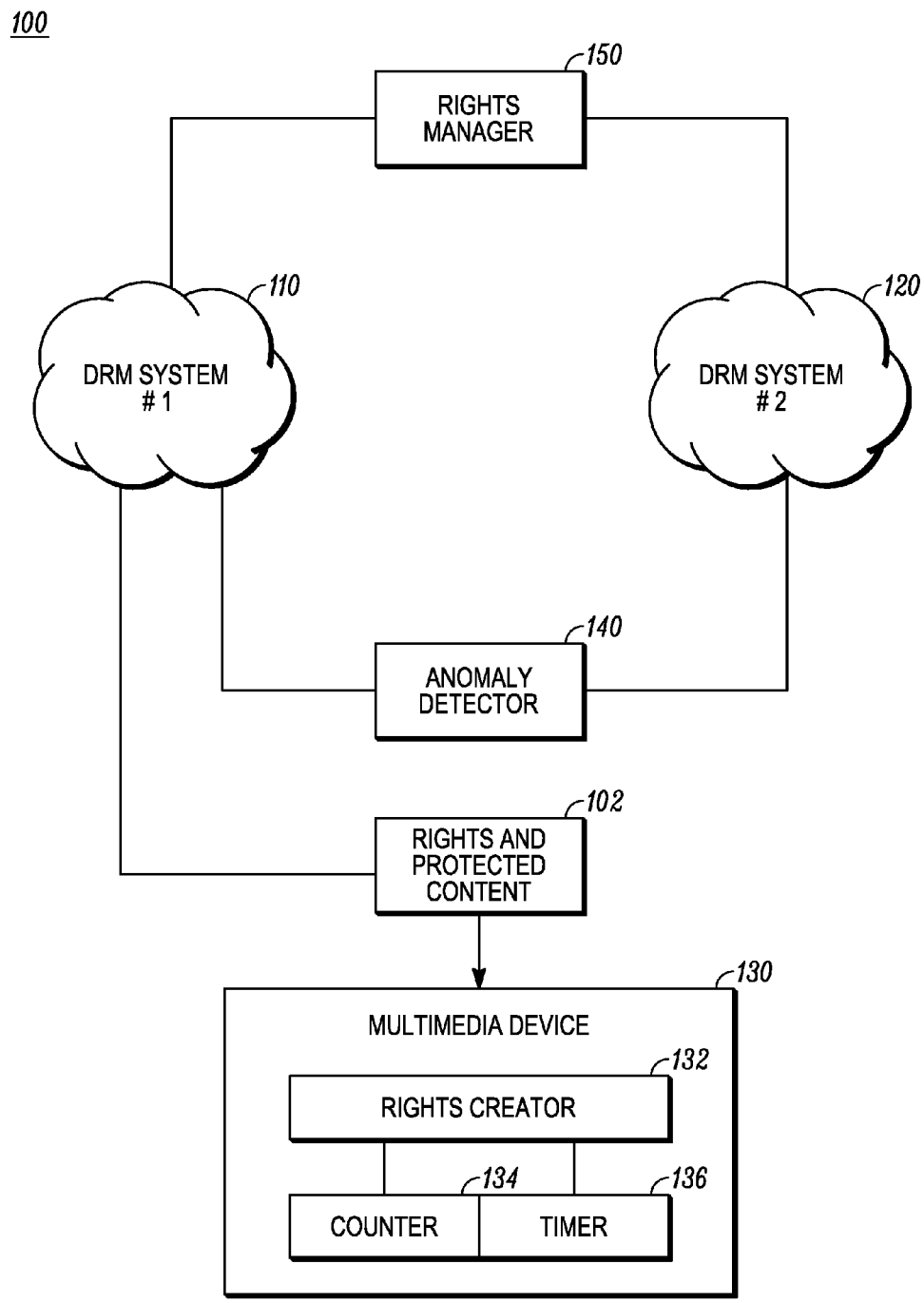
FIG. 1 illustrates a content distribution system that includes multiple DRM systems.

FIG. 1 illustrates a content distribution system or portion thereof 100 comprising a first DRM system 110 and a second DRM system 120. FIG. 1 also includes a multimedia device 130 that is capable of obtaining content from a content source via the content distribution system, which may protect its content by using a DRM system. As suggested above, the multimedia device may be implemented as a portable device like a wireless communication handset or a personal digital assistant or some other media playback or gaming device. Other multimedia devices are implemented as fixed base devices like a cable set-top box or a computer terminal.

Figure 2:
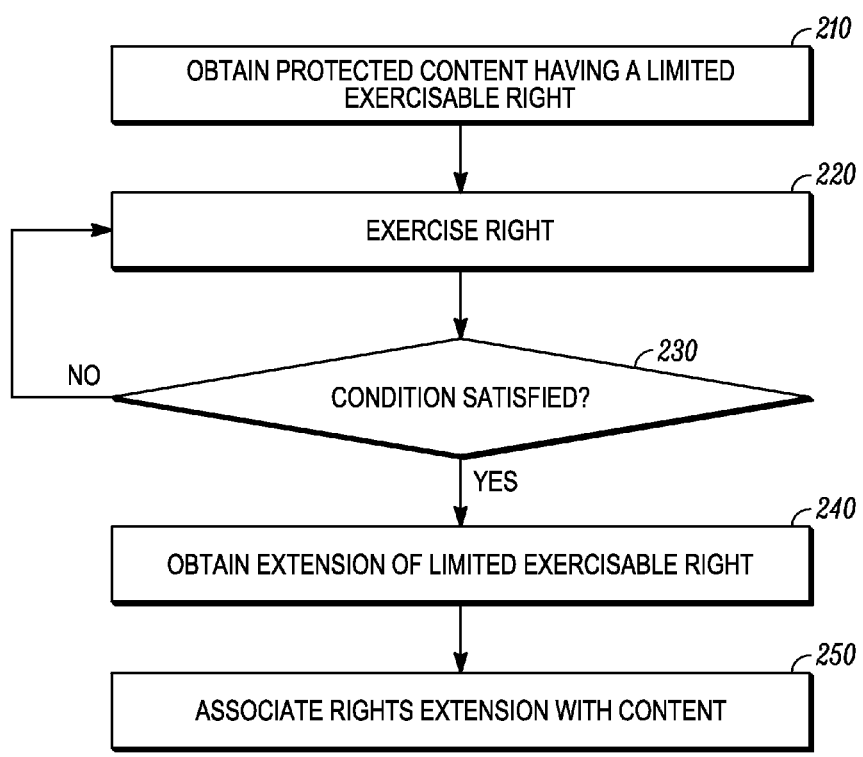
FIG. 2 illustrates a process flow diagram.

In FIG. 2, at 210, the multimedia device obtains content from a source. The content may be obtained from some source over a content distribution network. In FIG. 1, for example, the content is obtained via the DRM system 110. Alternatively, the content may be preloaded on the device at the time of manufacture or loaded onto the device manually by the user or at a point of sale of the device. In one embodiment, the content is protected and the protected content has associated therewith one or more exercisable rights. At 220, the user is thus free to exercise the right or rights associated with the content.

In some embodiments, the exercisable right associated with the content is limited. Content generally has associated therewith a bundle of rights. The exercisable right may be a right to copy, or a right to playback content, or a right to distribute, or perhaps a right to translate the content or a right of the content, among any other rights that may be granted in association with the content, and combinations thereof. The particular right or rights granted may depend to some extent on the content type. For example, it may be permissible to copy and distribute a video trailer, but it may be permissible to only playback the full video. The extent of the granted right may also depend on the content type. For example, it may be permissible to make unlimited copies and distributions of a video trailer, whereas the number of playback rights may be limited.

In one embodiment, the limitation on the exercisable right is controlled by a rights counter that changes count states relative to a count value upon exercising the right. According to this embodiment, the count value imposes a limitation on the number of times that the right may be exercised. An initial count value of the rights counter may correspond to a maximum number times that the content may be reproduced, copied, viewed, or distributed. The rights counter changes states by incrementing or decrementing in correspondence with each exercise of the right granted. The rights expire when the right has been exercised some number of times corresponding to the initial count value. In embodiments where multiple rights are granted, multiple counters may be used to control the exercise of the various rights. In some implementations, there is a counter for each right granted. In other implementations, one counter limits multiple rights.

In another embodiment, the limitation on the exercisable right is controlled by a rights duration clock that specifies a temporal duration during which the limited exercisable right is valid. The right duration may be initiated automatically or by some action performed by the user. For example, the rights duration may be initiated when the user first exercises a right granted in the content. Thus upon initiation of the rights duration, by whatever means, the user is free to exercise the rights granted within the allotted time duration. More generally, the right or rights granted may be bound by both a temporal limitation and a count limitation.

In embodiments where a limited exercisable right is granted in association with the protected content obtained by the multimedia device, an extension of the limited exercisable right may be obtained when a condition associated with the content is satisfied. Thus in FIG. 2, at block 230, a determination is made at the multimedia device as to whether a condition associated with the protected content is satisfied. In one embodiment, the condition tested is an extent to which the right has been exercised. Thus in one implementation, the condition is a limited exercisable right remaining after the exercise of at least some of the limited exercisable right. According to this implementation, the extension of the limited exercisable right is obtained based on the limited exercisable right remaining. In some instances, the extension is obtained before the limited exercisable right has been fully exercised, in other words before it expires. In other cases, the extension is obtained only after the limited exercisable right has been fully exercised. In FIG. 2, if the condition at block 230 is not satisfied, the algorithm loops back to block 220 where the user is free to continue to exercise the right granted. When the condition tested at block 230 is satisfied, the algorithm proceeds to block 240 where the extension of the limited exercisable right is obtained. At block 250, the rights extension is associated with the content as discussed more fully below.

In embodiments where the limited exercisable right is controlled by a rights counter that changes count states relative to a count value upon exercising the right, the limited exercisable right is extended using a new count value. The new count value may be the same as the original initial count value or it may be a greater or lesser value. The new count value provides the user with an increased number of instances during which the right or rights associated with the protected content may be exercised. The new count value is used as a basis for re-setting the rights count value. In embodiments where the limited exercisable right is controlled by a rights duration timer specifying a duration during which the limited exercisable right is valid, the limited exercisable right is extended using a new duration. The new rights duration may be the same as the original initial duration or it may be a greater or lesser value. The new duration nevertheless provides the user with an increased duration during which rights associated with the protected content may be exercised. The new rights duration is used as a basis for re-setting the rights duration associated with the protected content.

The algorithm of FIG. 2 and the variations encompassed herein may be readily implemented by a digital processor that executes code stored in memory on the multimedia device. FIG. 1 illustrates a rights creator entity 132 as a logical entity that performs various functions including obtaining extensions of the limited exercisable rights granted in protected content, among other functions discussed more fully below. In embodiments that implement a rights counter and/or a rights duration timer, the counter and timer may either be implemented as software or hardware elements in the multimedia device. In FIG. 1, the multimedia device includes a counter 134 and a timer 136.

The multimedia device obtains the extension of rights from an entity other than the multimedia device. In FIG. 1, the multimedia device obtains the extension of rights from an anomaly detection entity 140. In one embodiment, when the condition that prompts retrieval of the rights extension is satisfied, the multimedia device sends a hash of the protected content to the entity from which the extension is obtained. In FIG. 1, for example, the multimedia device 130 transmits the hash to the anomaly detector 140. In some instances, the hash may be appended with an identifier of the multimedia device so that the content can be uniquely distinguished among similar copies of the content obtained by multiple multimedia devices. As noted above, the condition that prompts retrieval of the extension may be based on the count value or time duration. In response to receiving the hash, the anomaly detector assigns the rights extension. In one implementation, the anomaly detector digitally signs the rights extensions before sending it to the multimedia device, for example, to the rights creator. The extent or scope of the rights extension may be based on a business arrangement with the rights grantor, for example, the content licensor.

In one implementation, upon receiving the rights extension, the multimedia device or the rights creator issues a rights object for the content wherein the rights object includes the digitally signed extension. The rights creator also associates the extension with the content, for example, by re-setting the rights counter or the rights duration. The rights creator also digitally signs the reset values of the counter or duration timers.

Figure 3:
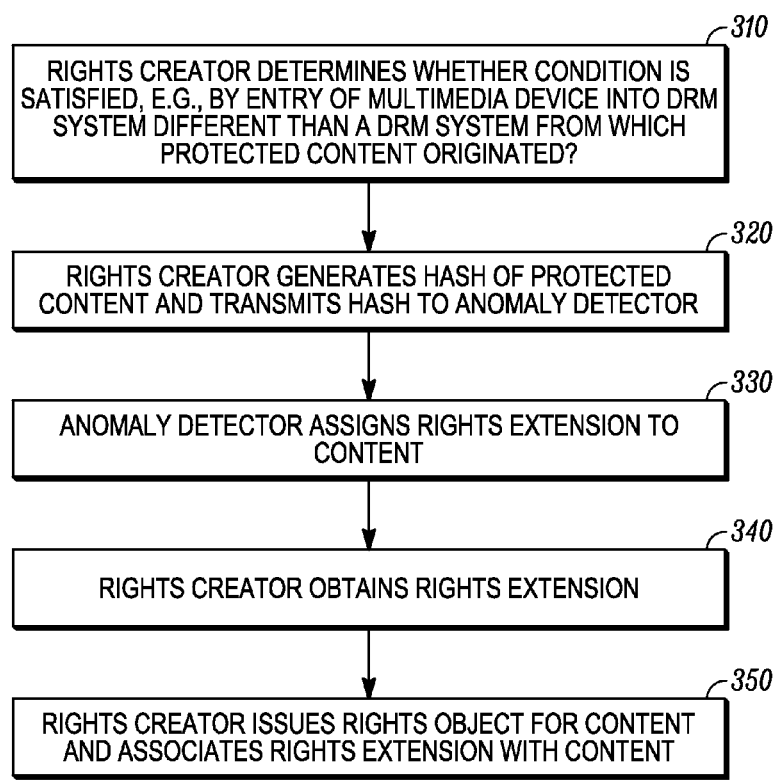
FIG. 3 illustrates a process flow diagram.

In one embodiment, the anomaly detection entity resides in the destination network, that is, the network to which the multimedia device is attached after obtaining the content. As noted, the destination network generally has a DRM system that is different than the DRM system from which the protected content originated. In one embodiment, the condition tested by the multimedia device is satisfied upon entry of the multimedia device into a second DRM system that is different than the first DRM system from which the protected content originated. In FIG. 3, at 310, a determination is made as to whether the multimedia device has entered a DRM system that is different than the DRM system from which the protected content originated. At 320, upon satisfaction of the condition, the multimedia device transmits a hash of the protected content to an anomaly detector in the new DRM system. The hash is typically generated by the multimedia device.

In one implementation, the rights creator creates the hash of the content and sends the hash to the anomaly detector when content from the first DRM system is presented to a rights creator for use in a second DRM system. In FIG. 3, at 330, upon receipt of the hash, the anomaly detector assigns a rights extension to the content. In one embodiment, the rights extension is based upon a business arrangement between the source DRM system and the destination DRM system. In FIG. 1, a rights manager entity 150 manages arrangements between different DRM systems.

In some implementations, the transmission of the hash to the anomaly detector occurs as soon as the content enters into a different DRM system. In other implementations, the hash may be generated and transmitted to the anomaly detector according to a schedule without regard for when the multimedia device has entered into a new DRM system. The schedule may be managed by the rights creator on the multimedia device. According to this alternative implementation, satisfaction of the condition is based upon a schedule wherein the hash is generated and transmitted according to the schedule.

In FIG. 3, at 340, the multimedia device, or the rights creator entity thereof, obtains the rights extension. Exemplary rights for which extensions may be obtained are discussed above. At 350, the multimedia device issues a rights object for the content and includes in the rights object the digitally signed rights extension. The rights creator also associates the extension with the content, for example, by resetting the rights counter or the rights duration. The rights creator also digitally signs the reset values of the counter or duration timers.

Each time an exercisable right associated with the content is exercised, the rights creator of the multimedia device accounts for the exercise, for example, by adjusting the counter value. In implementations where the count value is digitally signed, the rights creator digitally signs the adjusted counter value, removes the old count value from the rights object, and attaches the adjusted count value to the rights object. This process may continue until the some condition is satisfied whereupon the rights creator must seek a right extension, as discussed above in connection with FIG. 2.

Figure 4:
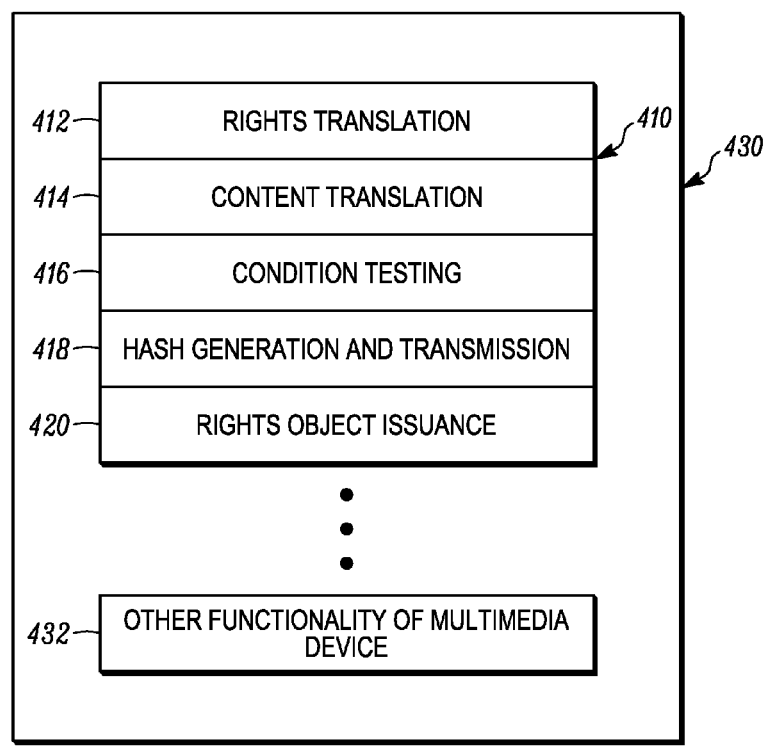
FIG. 4 illustrates a multimedia device.

In FIG. 4, the multimedia device comprises a rights creator 410 that performs various functions associated with the implementation of content piracy prevention algorithms. As suggested above, the rights creator may generally include rights translation functionality 412 to enable the translation of the rights granted in a first DRM system to the same or equivalent rights in a second DRM system. The rights creator may also include content translation functionality 414 to enable the translation of content from one DRM system to another DRM system. The rights creator also includes condition testing functionality 416, for example, to assess the conditions that prompt the generation and transmission of the content hash to the anomaly detector as discussed above in connection with FIGS. 2 and 3. The rights creator includes hash generating functionality 418 for generating the content hash and for prompting the transmission of the hash to the anomaly detector. The rights creator includes rights object issuance functionality 420 for issuing right objects with rights extensions and, in some embodiments, for digitally signing the rights objects. The rights creator also includes rights extension associating functionality 422 for associating rights extensions with content and, in some embodiments, for digitally signing the rights extensions. The rights creator may also include other functionality discussed herein. When implemented in software, the functionality of the rights creator is executed by a digital processor 430, which may perform other functionality of the multimedia device. These other functions of the multimedia device are indicated at 432. Such other functions include codecs for exercising rights associated with content, input and output control, among other functionality.

According to the implementation in the algorithm of FIG. 3, the anomaly detector may prevent the use of a DRM system to white-wash content pirated from another DRM system. Also, by gathering information about the extent to which the rights have been exercised and by timing the frequency of the requests for rights extensions, the anomaly detector can determine whether the content is being used within the scope of the exercisable rights granted. Based on the extend to which rights have been exercised by a particular rights creator, the anomaly detector can determine whether a multimedia device that presents content for use in a second DRM system is authorized to exercise the rights. The anomaly detector can also alert a network administrator or rights manager if the number of rights exercises by a particular rights creator exceeds some threshold. The anomaly detector can also alert a network administrator or rights manager if the number of rights exercises for a particular content exceeds some threshold. Such a threshold may be set to provide a preliminary indication as to whether the content is being used lawfully. In some instances, the anomaly detector may decline to extend rights or may revoke right associated with the content.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a multimedia device communicably coupled to a network, the method comprising:
    obtaining protected content that originates in a first DRM system,
    the protected content having a limited exercisable right associated therewith,
    obtaining an extension of the limited exercisable right when a condition is satisfied, the condition is satisfied upon entry of the multimedia device into a second DRM system that is different than the first DRM system from which the protected content originates, and
    the extension of the limited exercisable right obtained from an entity other than the multimedia device,
    transmitting a hash of the protected content to the entity from which the extension is obtained upon entry into the second DRM system,
    receiving the extension from an anomaly detector coupled to the first DRM system and the second DRM system, which is adapted for detecting any anomaly in the protected content in response to transmitting the hash, wherein the anomaly detector assigns the extension to the protected content after determining that the protected content is eligible for rights extension based upon a review of the hash of protected content received from the multimedia device, and
    associating the extension with the protected content.

2. The method of claim 1, the condition is a limited exercisable right remaining after exercise of at least some of the limited exercisable right, obtaining the extension of the limited exercisable right based on the limited exercisable right remaining.

3. The method of claim 1, obtaining the extension of the limited exercisable right includes receiving a default extension and associating the default extension with the protected content.

4. The method of claim 1, further comprising appending an identifier of the multimedia device to the hash before transmitting.

5. The method of claim 1,
    the condition is satisfied based upon a schedule,
    transmitting a hash of the protected content to the entity from which the extension is obtained according to the schedule,
    receiving the extension in response to transmitting the hash,
    associating the extension with the protected content.

6. The method of claim 5, further comprising appending an identifier of the multimedia device to the hash before transmitting.

7. The method of claim 1,
the limited exercisable right is controlled by a rights counter that changes count states relative to a count value upon exercising the right, the condition is a state of the counter,
obtaining the extension of the limited exercisable right when the count state satisfies a condition,
receiving the extension of the limited exercisable right includes receiving a new count value,
associating the extension of the limited exercisable right includes re-setting the rights counter based on the new count value.

8. The method of claim 7, further comprising digitally signing a value to which the rights counter is reset.

9. The method of claim 1,
the limited exercisable right is controlled by a rights duration timer specifying a duration during which the limited exercisable right is valid, the condition is based on the rights duration,
receiving the extension of the limited exercisable right includes receiving a new rights duration,
associating the extension of the limited exercisable right includes re-setting the rights duration based on the new rights duration.

10. The method of claim 9, digitally signing a value to which the rights duration is reset.

11. The method of claim 1,
the limited exercisable right includes a right to translate a right of the protected content;
obtaining the extension includes obtaining an extension of the right to translate the right of the protected content.

12. A method in a content distribution network infrastructure entity, the method comprising:
receiving a hash of protected content from a multimedia device, upon entry of the multimedia device into a second DRM system from a first DRM system, where the second DRM system is different from the first DRM system, and where the distributed content having a limited exercisable right associated therewith originates from the first DRM system;
providing an extension of a right, associated with the protected content, from an anomaly detector to the multimedia device after determining that the protected content is eligible for rights extension based upon a review of the hash of protected content received from the multimedia device.

13. The method of claim 12, determining whether the multimedia device from which the hash is received is eligible for a rights extension before providing the rights extension.

14. The method of claim 12, determining whether the content corresponding to the hash is eligible for a rights extension before providing the rights extension.

* * * * *